United States Patent
Ko et al.

(10) Patent No.: US 8,599,980 B2
(45) Date of Patent: Dec. 3, 2013

(54) BEAMFORMING APPARATUS AND METHOD IN MULTI-ANTENNA SYSTEM

(75) Inventors: Young Chai Ko, Seoul (KR); Hyun Ho Lee, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 0 days.

(21) Appl. No.: 13/469,591

(22) Filed: May 11, 2012

(65) Prior Publication Data

US 2013/0022143 A1    Jan. 24, 2013

(30) Foreign Application Priority Data

Jul. 21, 2011  (KR) .................. 10-2011-0072347

(51) Int. Cl.
*H04B 7/10*    (2006.01)
*H01Q 3/00*    (2006.01)

(52) U.S. Cl.
USPC ........... 375/349; 375/346; 375/316; 341/368; 341/350

(58) Field of Classification Search
USPC .................. 375/349, 346, 316; 342/368, 350
See application file for complete search history.

(56) References Cited

U.S. PATENT DOCUMENTS

2004/0178954 A1 *  9/2004  Vook et al. ............... 342/383
2013/0072124 A1 *  3/2013  Nsenga .................... 455/63.4

FOREIGN PATENT DOCUMENTS

| KR | 1020050013009 A | 2/2005 | |
|---|---|---|---|
| KR | 1020090085405 A | 8/2009 | |
| KR | 1020100034505 A | 4/2010 | |
| WO | WO-2010/040190 A1 * | 4/2010 | ............... H04B 7/02 |

OTHER PUBLICATIONS

Hyun-Ho Lee, et al; "Symbol-Wise Beamforming with Limited Feedback for MIMO-OFDM Systems", 2011 IEEE 73rd Vehicular Technology Conference (VTC Spring); May 15-18, 2011; 5 pages.

* cited by examiner

*Primary Examiner* — Chieh M Fan
*Assistant Examiner* — Michelle M Koeth
(74) *Attorney, Agent, or Firm* — Ladas & Parry LLP

(57) ABSTRACT

The present invention relates to a symbol-wise beamforming apparatus and method in an OFDM communication system using multiple antennas. A weight vector calculator calculates a transmit weight vector using a signal received through the multiple antennas as an input on the basis of channel information in the time domain and covariance matrix information about interference and noise and computes a receive weight vector using the calculated transmit weight vector. At least one of the calculated transmit weight vector and receive weight vector is transmitted to a transmission apparatus through a transmitter.

4 Claims, 5 Drawing Sheets

BEAMFORMING APPARATUS AND METHOD IN MULTI-ANTENNA SYSTEM

CROSS REFERENCE TO RELATED APPLICATIONS

This application claims the benefit of Korean Patent Application No. 10-2011-0072347, filed on Jul. 21, 2011, which is hereby incorporated by reference as if fully set forth herein.

BACKGROUND OF THE INVENTION

1. Field of the Invention

The present invention relates to a beamforming apparatus and method in a multi-antenna system, and more particularly, to a symbol-wise beamforming apparatus and method in an OFDM (Orthogonal Frequency Division Multiplexing) communication system using MIMO (Multiple Input Multiple Output).

2. Discussion of the Related Art

Mobile communication systems have evolved from systems providing an audio service to high-speed high-quality wireless data packet communication systems providing a data service and a multimedia service. HSDPA (High Speed Downlink Packet Access) and 1xEV-DV, which are currently commercialized, are representative solutions for achieving high-speed and high-quality services.

A main factor that hinders a high-speed and high-quality service in a mobile communication system is channel environment. For example, a wireless channel environment causes low reliability due to multipath interference, shadowing, pathloss, non-stationary noise, etc. this prevents a data transfer rate in mobile communication from increasing. To solve this, many techniques have been developed. Representative techniques include an error control scheme for suppressing influences of signal distortion and noise and a diversity scheme for overcoming fading.

Conventionally, diversity is obtained through time diversity, frequency diversity, multipath diversity, and space diversity in a mobile communication system.

Time diversity obtains temporal diversity by combining channel coding and interleaving. Frequency diversity obtains diversity in such a manner that signals transmitted at different frequencies are subjected to different multipath signals. Multipath diversity acquires diversity by separating multipath signals using different fading information for the signals. Space diversity obtains diversity according to independent fading signals by using a plurality of antennas for a transmitter or a receiver, or both the transmitter and the receiver. Space diversity uses an antenna array.

A mobile communication system using the antenna array, that is, a multi-antenna system includes a plurality of antennas for a transmitter/receiver thereof and uses a spatial domain to enhance frequency efficiency. It is easy to obtain a relatively high transfer rate using the spatial domain rather than using a limited time domain and frequency domain.

Furthermore, capacity provided by the multi-antenna system is much higher than that accomplished by conventional wireless systems. The increased capacity can remarkably improve performance of a wireless communication system.

The multi-antenna system corresponds to a MIMO system because the antennas of the multi-antenna system respectively transmit independent information. The MIMO system is used to improve reliability and transmission efficiency through spatial multiplexing and space-time coding without increasing a frequency band or transmit power.

In addition, OFDM with high resource utilization efficiency is proposed to provide a high-quality data service. Accordingly, a fourth generation mobile communication system considers use of OFDM. A system using OFDM is a multi-access system for a plurality of users. A representative of the OFDM system is an OFDMA (OFDM-FDMA) system that allows multiple users to use different subcarriers at the same time.

It is known in the art that high frequency efficiency can be obtained in a frequency selective channel environment when the MIMO scheme and OFDM scheme are combined. A wireless communication system employing a combination of the MIMO scheme and the OFDM scheme is referred to as a 'MIMO-OFDM communication system' hereinafter.

The MIMO-OFDM communication system supports transmission beamforming and reception beamforming in order to obtain space diversity. For beamforming in the MIMO-OFDM communication system, a technique of providing information about channel characteristics measured by a receiver to a transmitter through a feedback channel is used.

In this case, to minimize resource loss, development of a scheme for minimizing the quantity of feedback information provided to the transmitter through the feedback channel is continuously performed.

Related art includes Korean Patent No. 10-2010-0034505 (opened on 1 Apr. 2010) (referred to as 'Reference 1') and Korean Patent No. 10-2009-0085405 (opened on 7 Aug. 2009) (referred to as 'Reference 2').

Reference 1 discloses 'Channel information feedback apparatus and method for generating multiple-antenna beam in OFDM system' and Reference 2 discloses 'Apparatus and method for determining channel quality information in consideration of beamforming in multi-antenna system'.

A representative beamforming scheme in the MIMO-OFDM communication system independently applies transmission beamforming and reception beamforming to all subcarriers, which is called 'subcarrier-wise beamforming'.

While the subcarrier-wise beamforming scheme can achieve optimal performance, it has high computational complexity because respective antennas require a discrete Fourier transform (DFT) processor.

Furthermore, the subcarrier-wise beamforming scheme needs to feed back a transmit weight vector optimized to all subcarriers to the transmitter, and thus feedback load increases in proportion to the number of subcarriers.

A symbol-wise beamforming scheme respectively using one DFT processor for a transmitter and a receiver can reduce computational complexity and feedback load.

However, the symbol-wise beamforming scheme still has high computational complexity because a transmit/receive vector is computed on the basis of an iterative algorithm.

SUMMARY OF THE INVENTION

An embodiment of the present invention is to provide a non-iterative algorithm for applying a low-complexity symbol-wise beamforming scheme to a MIMO-OFDM communication system.

Another embodiment of the present invention is to provide an apparatus and method for performing beamforming for transmission/reception using a non-iterative algorithm in a MIMO-OFDM communication system.

Another embodiment of the present invention is to provide a beamforming apparatus and method for feeding back a weight vector, which is computed using a non-iterative algorithm in a receiver of a MIMO OFDM communication system, to a transmitter of the MIMO-OFDM communication system.

In an aspect of the present invention, a reception beamforming apparatus of a communication system supporting OFDM using multiple antennas includes a weight vector calculator for calculating a transmit weight vector based on channel information and covariance matrix information about interference and noise in the time domain using a signal received through the multiple antennas as an input, and for computing a receive weight vector using the calculated transmit weight vector, and a transmitter for feeding back at least one of the calculated transmit weight vector and receive weight vector to a transmission apparatus.

In another aspect of the present invention, a reception beamforming method of a communication system supporting OFDM using multiple antennas includes calculating a transmit weight vector based on channel information and covariance matrix information about interference and noise in the time domain using a signal received through the multiple antennas as an input, computing a receive weight vector using the calculated transmit weight vector, and feeding back at least one of the calculated transmit weight vector and receive weight vector to a transmission apparatus.

According to embodiments of the present invention, it is possible to prevent performance deterioration and remarkably reduce computational complexity by using a non-iterative algorithm in a MIMO-OFDM communication system using symbol-wise beamforming.

Detailed effects of the invention will be described below.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

In the following embodiments of the present invention, a MIMO-OFDM communication system supports a symbol-wise beamforming scheme based on a non-iterative algorithm instead of an iterative algorithm.

To achieve this, an embodiment of the present invention estimates a transmit weight vector that can maximize a lower bound value of a signal-to-interference plus noise ratio (SINR) for each subcarrier in the time domain from a received signal. The embodiment of the present invention estimates a receive weight vector for maximizing an SINR for each subcarrier in the time domain using the estimated transmit weight vector.

As described above, the embodiment of the present invention can optimize the transmit/receive weight vectors without using an iterative algorithm by obtaining the transmit weight vector using channel information in the time domain and covariance matrix information of interference and noise and computing the receive weight vector using the transmit weight vector.

Embodiments of the present invention will be described in detail with reference to the attached drawings. The same reference numbers will be used throughout this specification to refer to the same or like parts.

Figure 1:
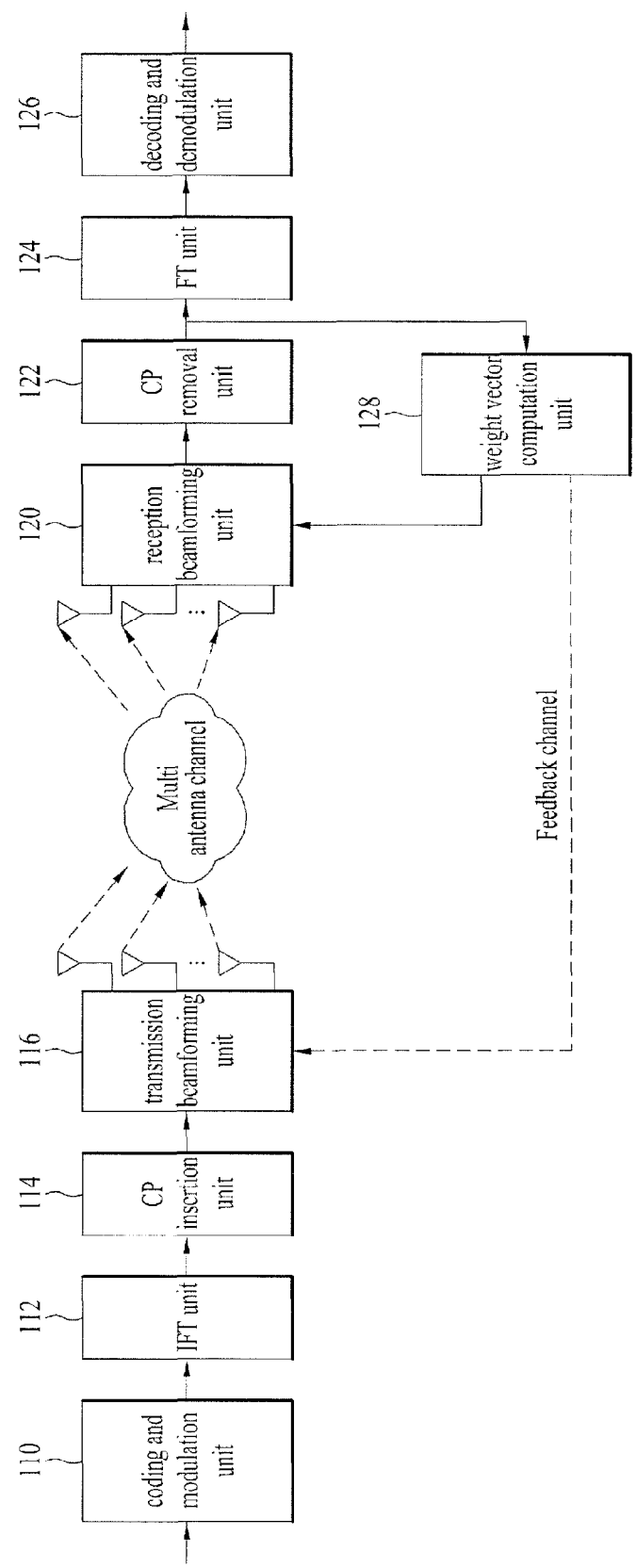
FIG. 1 illustrates an exemplary configuration of a MIMO-OFDM communication system according to an embodiment of the present invention.

FIG. 1 illustrates an exemplary configuration of a MIMO-OFDM communication system according to an embodiment of the present invention.

Referring to FIG. 1, the MIMO-OFDM communication system includes a transmitter, a receiver, and a multi-antenna channel that supports communication between the transmitter and the receiver. For example, the multi-antenna channel can be a radio channel through which communication is performed via a wireless network using multiple antennas included in the transmitter and the receiver. Here, the wireless network can include 3G, 4G, wireless LAN, etc.

The transmitter includes a coding and modulation unit 110, an inverse Fourier transform (IFT) unit 112, a cyclic prefix insertion unit (referred to as a "CP insertion unit" hereinafter) 114, a transmission beamforming unit 116, and multiple antennas.

The receiver includes multiple antennas, a reception beamforming unit 120, a cyclic prefix removal unit (referred to as "CP removal unit" hereinafter) 122, a Fourier transform unit (referred to as "FT unit" hereinafter) 124, a decoding and demodulation unit 126, and a weight vector computation unit 128.

The transmitter is described first. The coding and modulation unit 110 encodes input data to be transmitted at a predetermined coding rate and modulates an encoded bit stream, obtained through encoding, according to a predetermined modulation scheme to generate a modulated symbol. Here, the used coding rate and modulation scheme may be fixed to a specific coding rate and modulation scheme or changed according to channel environment. The coding rate and modulation scheme is well-known in the art and as such a detailed description thereof is omitted.

The IFT unit 112 inverse-Frourier-transforms the modulated symbol received from the coding and modulation unit 110. That is, the IFT unit 112 transforms the modulated symbol in the frequency domain into a modulated symbol in the time domain. The IFT includes inverse discrete Fourier transform (IDFT) and inverse fast Fourier transform (IFFT). While both IDFT and IFFT can be used in the embodiment of the present invention, IDFT is used in the following description for convenience. However, the present invention is not limited to IDFT.

The CP insertion unit 114 inserts a CP into the modulated symbol in the time domain, which is received from the IFT unit 112. In general, the CP is inserted in order to prevent interference of neighboring modulated symbols or interference of neighboring time slots.

The transmission beamforming unit 116 beamforms the modulated symbol supplied from the CP insertion unit 114 on the basis of feedback information received from the receiver and transmits the beamformed information through multiple transmission antennas. Beamforming of the modulated symbol based on the feedback information received from the receiver can be performed using a technology conventionally used in a MIMO-OFDM communication system. However, the feedback information from the receiver needs to directly include a transmit weight vector v that is necessary for transmission beamforming or include computation information that is necessary to obtain the transmit weight vector v in the embodiments of the present invention. For example, the computation information can be a receive weight vector u or information about channel quality of each of the multiple antennas. A representative of the information about channel quality of each of the multiple antennas may be an SINR measured for each of the multiple antennas.

However, if the transmit weight vector v is not directly provided as the feedback information, the transmitter needs to perform a procedure for calculating the transmit weight vector v for transmission beamforming using the feedback information from the receiver.

The signal subjected to transmission beamforming is transmitted by the transmitter through the multi-antenna channel and received by the receiver through the multiple antennas of the receiver.

The receiver will now be described. The reception beamforming unit 120 performs beamforming on the signal received by the multiple antennas of the receiver via the multi-antenna channel. Here, the reception beamforming unit 120 uses a receive weight vector $u^H$ to perform reception beamforming. The receive weight vector $u^H$ used for the reception beamforming may be calculated by the weight vector computation unit 128, which will be described later.

The CP removal unit 122 removes the CP from the modulated symbol provided by the reception beamforming unit 120. Removal of the CP from the modulated symbol is a general process in a communication system that transmits/receives data according to OFDM.

The FT unit 124 Fourier-transforms the modulated symbol from which the CP has been removed by the CP removal unit 122. That is, the FT unit 124 transforms the modulated symbol in the time domain into a modulated symbol in the frequency domain. The FT includes discrete Fourier transform (DFT) and fast Fourier transform (FFT). While both DFT and FFT can be used in the embodiment of the present invention, DFT is used in the following description for convenience. However, the present invention is not limited to DFT.

The decoding and demodulation unit 126 demodulates the modulated symbol in the frequency domain according to a predetermined modulation scheme and decodes a bit stream output from the decoding and demodulation unit 126. The demodulation scheme and a decoding scheme can be performed in consideration of the modulation scheme, coding scheme and coding rate used in the transmitter.

The weight vector computation unit 128 receives the modulated symbol in the time domain, prior to being subjected to FT, and computes the receive weight vector u and the transmit weight vector v using the modulated symbol in the time domain. The weight vector computation unit 128 may selectively compute the transmit weight vector v according to type of feedback information to be provided to the transmitter. For example, the weight vector computation unit 128 may not compute the transmit weight vector v when the transmit weight vector v is not directly included in the feedback information.

However, it is desirable to calculate the transmit weight vector v since the receive weight vector u is computed using the transmit weight vector v in the embodiment of the present invention.

The weight vector computation unit 128 provides the computed receive weight vector u to the reception beamforming unit 120, includes the computed transmit weight vector v in the feedback information and transmits the feedback information including the transmit weight vector v to the transmitter through a feedback channel.

Figure 2:
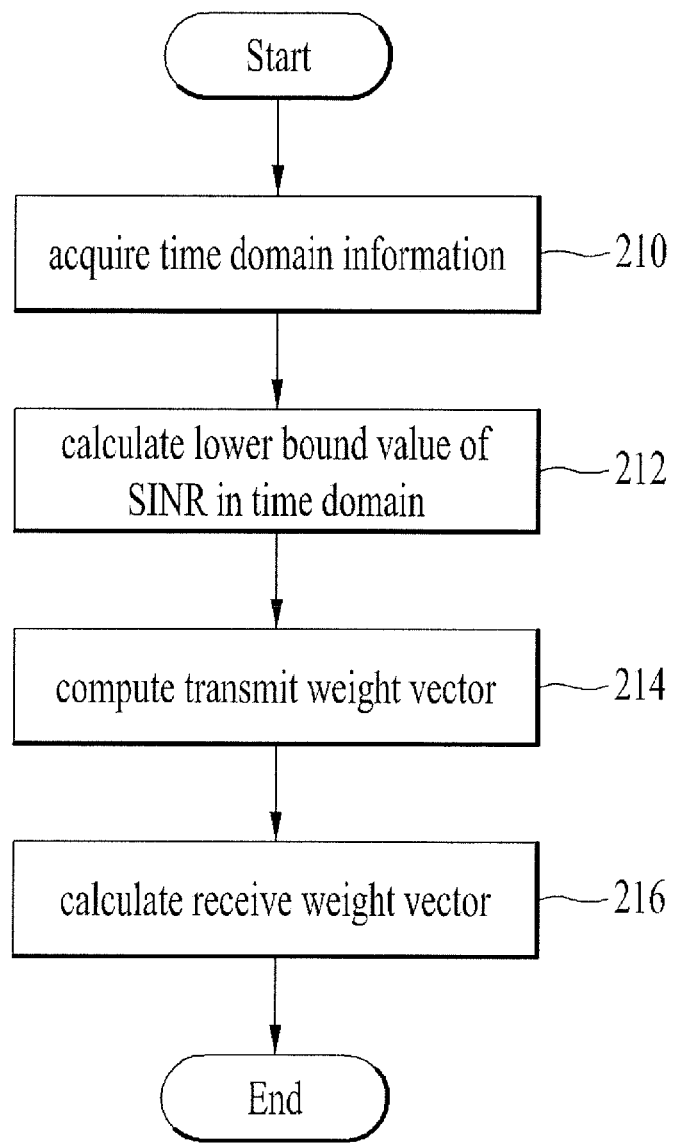
FIG. 2 is a flowchart illustrating a reception beamforming procedure in a receiver of a MIMO-OFDM communication system according to an embodiment of the present invention.

Description of the detailed operation of the weight vector computation unit 128 to compute the receive weight vector u is replaced by description of a control flow shown in FIG. 2 because embodiments of the present invention employ a non-iterative algorithm instead of an iterative algorithm used in conventional symbol-wise beamforming.

FIG. 2 is a flowchart illustrating a control flow for reception beamforming in a receiver of a MIMO-OFDM communication system according to an embodiment of the present invention. That is, FIG. 2 illustrates a procedure of estimating transmit/receive weight vectors necessary for transmission beamforming and reception beamforming in the receiver of the MIMO-OFDM communication system according to an embodiment of the present invention.

Referring to FIG. 2, the receiver acquires information in the time domain in step 210. That is, the receiver obtains information necessary to estimate the transmit and receive weight vectors from a received signal prior to being subjected to FT.

More specifically, a received signal at an n-th subcarrier can be represented by equation 1.

$$y_n = u^H H_n v s_n + u^H w_n \quad \text{[Expression 1]}$$

Here, v represents the transmit weight vector, u represents the receive weight vector, $H_n$ denotes a channel frequency response corresponding to the n-th subcarrier, $s_n$ denotes a data symbol corresponding to the n-th subcarrier, and $w_n$ represents the sum of interference and a noise signal corresponding to the n-th subcarrier.

In expression 1, $w_n$ can be defined as the following expression 2.

$$w_n = h_{int,n} x_{int,n} + z_n \quad \text{[Expression 2]}$$

Here, $h_{int,n}$ represents a channel frequency response between an interference source and a receiver and can be defined as $\Sigma_{l=0}^{L_{int}-1} h_{int,l} e^{j2\pi ln/N}$. In this case, $h_{int,n}$ has a correlation matrix of where $\sigma^2_{int,l} R_{int,r,l}$ where $R_{int,r,l}$ can be defined using $\rho_{int,r,l}$ and $\overline{\phi}_{DoA,int,l}$.

It is assumed that an interference component $x_{int,n}$ corresponds to independent and identically distributed Gaussian variables having a mean of 0 and a variance of $\mathbb{E}[|x_{int,n}|^2]$ $=\sigma_{in}^2$ and $z_n$ corresponds to independent and identically distributed Gaussian vectors having a mean of 0 and a correlation matrix of $\sigma_z^2 I_{M_r}$.

When the received signal at the n-th subcarrier, defined as expression 1, is inverse-discrete-Fourier-transformed, expression 3 can be obtained. That is, the received signal in the frequency domain, defined by expression 1, can be transformed into the signal in the time domain through IDFT, represented as expression 3.

$$y[k] = \sum_{l=0}^{L-1} u^H H_l v s[k-l] + u^H w[k] \qquad \text{[Expression 3]}$$

Here, $H_l$ denotes an l-th channel tap matrix. Expression 3 assumes a channel having L channel taps on the basis of the Kronecker model in order to consider spatial correlation of MIMO channels formed by multiple antennas.

The l-th channel tap matrix is based on distribution of $H_l \sim CN(0, R_l)$. . . . Here, a mean matrix is a matrix in which all elements are zero and a correlation matrix is $R_l = \sigma_l^2 R_{t,l} \otimes R_{r,l}$ where $\sigma_l^2$ is a mean power delay profile that satisfies $\Sigma_{l=0}^{L-1} \sigma_l^2 = 1$ and $\otimes$ denotes Kronecker product.

The l-th channel tap matrix can be represented by the following expression 4.

$$H_l = \sigma_l R_{r,l}^{1/2} G_l R_{t,l}^{T/2}, l=0, 1, \ldots, L-1 \qquad \text{[Expression 4]}$$

Here, $R_{t,l} \in \mathbb{C}^{M_t \times M_t}$ and $R_{r,l} \in \mathbb{C}^{M_r \times M_r}$ respectively denote a transmission correlation matrix and a reception correlation matrix and $G_l \in \mathbb{C}^{M_r \times M_t}$ is a matrix composed of independent and identically distributed Gaussian variables having a mean of 0 and a variance of 0.

In expression 4, a matrix element (a, b) of $H_l$ denotes channel gain between a b-th transmit antenna and an a-th receive antenna.

Accordingly, matrix elements (a, b) of transmission correlation matrix $R_{t,l}$ and reception correlation matrix $R_{r,l}$ can be represented by the following expression 5.

$$[R_{t,l}]_{(a,b)} = \rho_{t,l}^{|b-a|} e^{j2\pi(a-b)d_t \sin(\overline{\varphi_{DoD,l}})} \qquad \text{[Expression 5]}$$
$$[R_{r,l}]_{(a,b)} = \rho_{r,l}^{|b-a|} e^{j2\pi(a-b)d_r \sin(\overline{\varphi_{DoA,l}})}$$

Here, $\rho_{t,l}$, $\rho_{r,l}$, $d_t$, $d_r$, $\overline{\phi}_{DoD,l}$ and $\overline{\phi}_{DoA,l}$ denote a transmission correlation coefficient, a reception correlation efficient, a normalized distance between transmit antennas, a normalized distance between receive antennas, a mean departure direction and a mean arrival direction, respectively.

Upon acquisition of the information in the time domain according to the above-mentioned operation, the receiver computes a lower bound value for a signal prior to being subjected to OFDM demodulation in step 212. The signal prior to being subjected to OFDM demodulation means the received signal prior to being subjected to FT.

The following expression 6 defines an SINR in the time domain, prior to OFDM demodulation.

$$SINR_{pr}(u,v) = \frac{\mathbb{E}\left[\left|\sum_{l=0}^{L-1} u^H H_l v s[k-l]\right|^2\right]}{\mathbb{E}[|u^H w[k]|^2]} \qquad \text{[Expression 6]}$$
$$= \frac{P_s \sum_{l=0}^{L-1} |u^H H_l v|^2}{u^H R_w u}$$
$$= \frac{u^H \left(P_s \sum_{l=0}^{L-1} H_l v v^H H_l^H\right) u}{u^H R_w u}$$

Here, $P_s$ denotes subcarrier mean power and $R_w$ denotes a covariance matrix.

A transmit weight vector and a receive weight vector which maximize the SINR prior to OFDM demodulation are obtained using a non-iterative algorithm.

A lower bound value of the received SINR prior to OFDM demodulation defined by expression 6 is represented as the following expression 7.

$$SINR_{pr}(u,v) \geq v^H (P_s/L \Sigma_{l=0}^{L-1} H_l^H R_w^{-1} H_l) v \qquad \text{[Expression 7]}$$

The receiver finds the transmit weight vector v for maximizing the lower bound value of the received SINR in step 214.

For example, the transmit weight vector for maximizing the lower bound value of the received SINR defined as expression 7 can be estimated according to the following expression 8.

$$\hat{v} = \Phi_{max}[P_s/L \Sigma_{l=0}^{L-1} H_l^H R_w^{-1} H_l] \qquad \text{[Expression 8]}$$

Here, $\Phi_{max}[\cdot]$ denotes an Eigen value corresponding to a maximum Eigen value of a matrix.

Upon estimation of the transmit weight vector v, the receiver estimates the receive weight vector u using the estimated transmit weight vector v in step 216.

For example, the receive weight vector for maximizing the received SINR prior to OFDM demodulation can be estimated using the following expression 9 using the transmit weight vector v estimated according to expression 8.

$$\hat{u} = \Phi_{max}[P_s R_w^{-1} \Sigma_{l=0}^{L-1} H_l v v^H H_l^H] \qquad \text{[Expression 9]}$$

Upon completion of computation of the transmit weight vector and the receive weight vector, the receiver configures feedback information on the basis of the transmit weight vector and the receive weight vector, which is not shown in FIG. 2. The feedback information is used to determine information necessary to perform beamforming for a signal to be transmitted by the transmitter. Accordingly, the feedback information is preferably composed of information necessary for the transmitter to perform beamforming.

For example, the feedback information can include the transmit weight vector computed in step 214 or include information necessary for the transmitter to calculate the transmit weight vector. For example, the information necessary for the transmitter to calculate the transmit weight vector can be an SINR measured for each subcarrier.

It is possible to obtain the transmit weight vector using the channel information in the time domain and covariance matrix information of interference and noise and to compute the receive weight vector using the transmit weight vector according to the aforementioned procedure shown in FIG. 2. Accordingly, the scheme for obtaining the transmit weight vector and the receive weight vector, proposed by an embodiment of the present invention can achieve transmit/receive weight vector optimization since it does not use an iterative algorithm.

Figure 3:
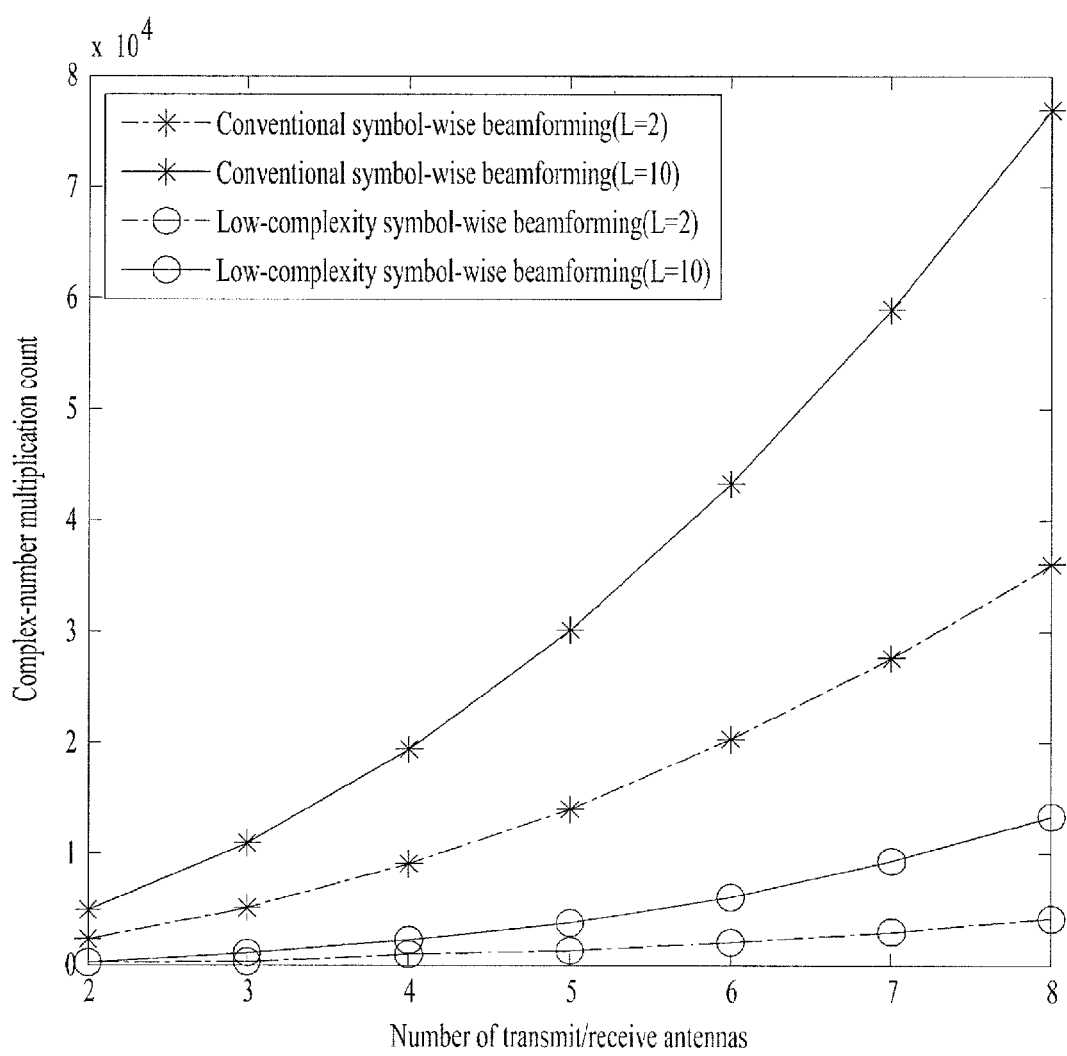
FIG. 3 is a graph showing comparison of the number of complex-number multiplications for conventional symbol-wise beamforming to the number of complex-number multiplications for symbol-wise beamforming according to an embodiment of the present invention through experimental results.

FIG. 3 is a graph showing comparison of the number of complex-number multiplications for conventional symbol-wise beamforming with the number of complex-number multiplications for symbol-wise beamforming according to an embodiment of the present invention through experimental results.

Referring to FIG. 3, when the same number of transmit/receive antennas is used in channel environments (L-2 and L-10) having the some channel tap, the number of complex-number multiplications in a low-complexity symbol-wise beamforming scheme according to an embodiment of the present invention can be reduced as compared to the number of complex-number multiplications in a conventional symbol-wise beamforming scheme. Reduction in the number of complex-number multiplications means a decrease in computational complexity.

For example, if L is 10 and the number of transmit/receive antennas is 7, the number of complex-number multiplications in the low-complexity symbol-wise beamforming scheme according to an embodiment of the present invention is 1 whereas the number of complex-number multiplications in the conventional symbol-wise beamforming scheme is 7.

Figure 4:
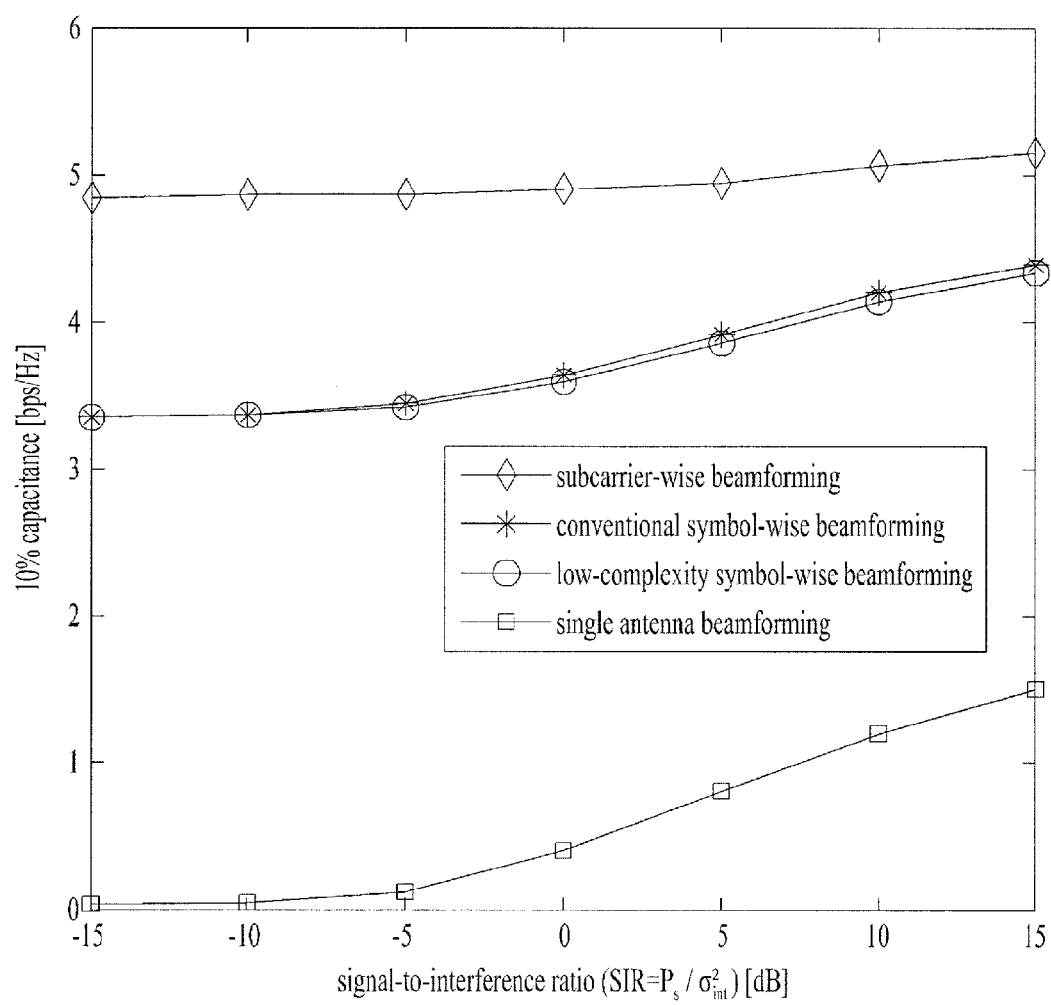
FIG. 4 is a graph showing a signal-to-noise ratio versus capacitance according to conventional symbol-wise beamforming and a signal-to-noise ratio versus capacitance according to symbol-wise beamforming according to an embodiment of the present invention.

FIG. 4 is a graph showing signal-to-noise ratio versus capacitance according to conventional symbol-wise beamforming and signal-to-noise ratio versus capacitance according to symbol-wise beamforming in accordance with an embodiment of the present invention.

It can be confirmed from FIG. 4 that 10% capacitance variation according to SINR variation when the conventional symbol-wise beamforming scheme is used is almost identical to that in the case of the low-complexity symbol-wise beamforming scheme according to an embodiment of the present invention.

Figure 5:
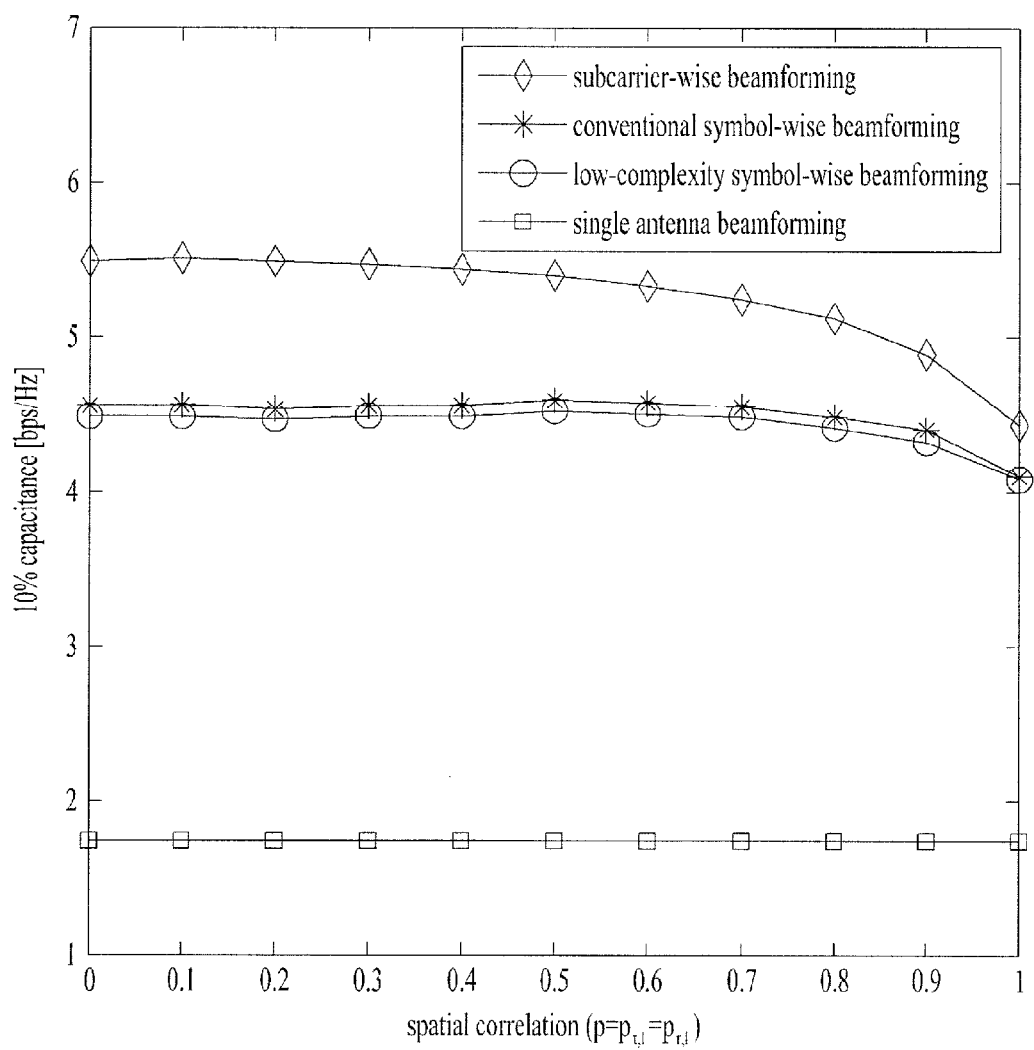
FIG. 5 is a graph showing comparison of spatial correlation according to conventional symbol-wise beamforming with spatial correlation according to symbol-wise beamforming in an embodiment of the present invention.

FIG. 5 is a graph showing comparison of spatial correlation according to conventional symbol-wise beamforming with spatial correlation according to symbol-wise beamforming in an embodiment of the present invention.

It can be confirmed from FIG. 5 that 10% capacitance variation according to spatial correlation variation when the conventional symbol-wise beamforming scheme is used is almost identical to that in the case of the low-complexity symbol-wise beamforming scheme according to an embodiment of the present invention.

Although the present invention has been described with reference to the limited embodiments and the drawings, the present invention is not limited to the embodiments and those skilled in the art will be able to make various modifications and changes from the description. Accordingly, the scope of the present invention should not be determined by the above description but should instead be determined by not only the appended claims but also equivalents to the claims.

What is claimed is:

1. A reception beamforming apparatus of a communication system supporting an orthogonal frequency division multiplexing (OFDM) using multiple antennas, the reception beamforming apparatus comprising:

a weight vector calculator for calculating a transmit weight vector based on channel information and covariance matrix information about interference and noise in a time domain derived by using a signal received through the multiple antennas as an input, and for computing a receive weight vector using the calculated transmit weight vector; and a transmitter for feeding back at least one of the calculated transmit weight vector and the receive weight vector to a transmission apparatus, wherein the weight vector calculator calculates the transmit weight vector according to $\hat{v}=\Phi_{max}[P_s/L\Sigma_{l=0}^{L-1}H_l^H R_w^{-1}H_l]$, and computes the receive weight vector according to $\hat{u}=\Phi_{max}[P_s R_w^{-1}\Sigma_{l=0}^{L-1}H_l vv^H H_l^H]$, wherein $\Phi_{max}[.]$ denotes an Eigen value corresponding to a maximum Eigen value of a matrix, $P_s$ denotes subcarrier mean power, $R_w$ represents a covariance matrix, and $H_l$ represents an l-th channel tap matrix, and L represents a number of channel taps.

2. The reception beamforming apparatus according to claim 1, wherein the weight vector calculator estimates the transmit weight vector that maximizes a lower bound value of a received signal-to-interference plus noise ratio (SINR) in the time domain in response to a specific subcarrier, and estimates the receive weight vector that maximizes the received SINR in the time domain in response to the specific subcarrier using the estimated transmit weight vector.

3. A reception beamforming method of a communication system supporting OFDM using multiple antennas, the reception beamforming method comprising:

calculating a transmit weight vector based on channel information and covariance matrix information about interference and noise in a time domain derived by using a signal received through the multiple antennas as an input;

computing a receive weight vector using the calculated transmit weight vector; and feeding back at least one of the calculated transmit weight vector and the receive weight vector to a transmission apparatus wherein the weight vector calculator calculates the transmit weight vector, wherein the calculating of the transmit weight vector is according to $\hat{v}=\Phi_{max}[P_s/L\Sigma_{l=0}^{L-1}H_l^H R_w^{-1}H_l]$, and computing the receive weight vector is according to $\hat{u}=\Phi_{max}[P_s R_w^{-1}\Sigma_{l=0}^{L-1}H_l vv^H H_l^H]$, wherein $\Phi_{max}[.]$ denotes an Eigen value corresponding to a maximum Eigen value of a matrix, $P_s$ denotes subcarrier mean power, $R_w$ represents a covariance matrix, and $H_l$ represents an l-th channel tap matrix and L represents a number of channel taps.

4. The reception beamforming method according to claim 3, wherein the transmit weight vector is estimated according to the transmit weight vector that maximizes a lower bound value of a received signal-to-interference plus noise ratio (SINR) in the time domain in response to a specific subcarrier, and the receive weight vector is estimated according to the receive weight vector that maximizes the received SINR in the time domain in response to the specific subcarrier using the estimated transmit weight vector.

* * * * *